United States Patent
Tian et al.

(10) Patent No.: US 12,442,134 B2
(45) Date of Patent: *Oct. 14, 2025

(54) METHOD FOR PREPARING UNBLEACHED BIOMECHANICAL PULP FROM STRAWS AND FULL UTILIZATION OF BY-PRODUCTS

(71) Applicant: Qilu University of Technology, Jinan (CN)

(72) Inventors: Zhongjian Tian, Jinan (CN); Ruiming Wang, Jinan (CN); Xingxiang Ji, Jinan (CN); Yinkai Ge, Jinan (CN); Jiachuan Chen, Jinan (CN); Guihua Yang, Jinan (CN); Hao Ma, Jinan (CN)

(73) Assignee: Qilu University of Technology, Jinan (CN)

( * ) Notice: Subject to any disclaimer, the term of this patent is extended or adjusted under 35 U.S.C. 154(b) by 965 days.

This patent is subject to a terminal disclaimer.

(21) Appl. No.: 17/561,482

(22) Filed: Dec. 23, 2021

(65) Prior Publication Data

US 2022/0205179 A1   Jun. 30, 2022

(30) Foreign Application Priority Data

Dec. 31, 2020   (CN) .......................... 202011639137.3

(51) Int. Cl.
| | |
|---|---|
| *D21C 5/00* | (2006.01) |
| *C05F 5/00* | (2006.01) |
| *D21C 1/02* | (2006.01) |
| *D21C 1/04* | (2006.01) |
| *D21C 1/06* | (2006.01) |
| *D21C 9/02* | (2006.01) |
| *D21C 11/00* | (2006.01) |
| *D21H 11/12* | (2006.01) |
| *D21H 17/00* | (2006.01) |

(52) U.S. Cl.
CPC .............. *D21C 5/005* (2013.01); *C05F 5/008* (2013.01); *D21C 1/02* (2013.01); *D21C 1/04* (2013.01); *D21C 1/06* (2013.01); *D21C 9/02* (2013.01); *D21C 11/0007* (2013.01); *D21H 11/12* (2013.01); *D21H 17/005* (2013.01)

(58) Field of Classification Search
CPC ............. D21C 1/06; D21C 1/02; D21C 5/005
See application file for complete search history.

(56) References Cited

U.S. PATENT DOCUMENTS

| | | | | |
|---|---|---|---|---|
| 10,087,476 | B2 * | 10/2018 | Foody | ................ D21C 11/0007 |
| 10,240,171 | B2 * | 3/2019 | Baets | ........................ D21C 1/06 |
| 11,624,154 | B2 * | 4/2023 | Chen | ........................ D21C 1/06 |
| | | | | 162/91 |
| 11,834,784 | B2 * | 12/2023 | Ji | ............................ D21H 11/18 |
| 2005/0241785 | A1 * | 11/2005 | Peng | ...................... D21B 1/021 |
| | | | | 162/96 |

FOREIGN PATENT DOCUMENTS

WO    WO-2009056017 A1 *  5/2009  .............. C05F 11/00

* cited by examiner

*Primary Examiner* — Anthony Calandra
(74) *Attorney, Agent, or Firm* — Flener IP & Business Law; Zareefa B. Flener

(57) ABSTRACT

The present disclosure relates to a method for preparing an unbleached biomechanical pulp from straws and full utilization of by-products, which belongs to the technical field of papermaking technology and waste comprehensive utilization. In the present disclosure, straw as raw material for pulping is treated with steam, then a small amount of KOH is added, the straw is softened by hydrothermal saturation, then the temperature of the straw is adjusted, alkaline compound enzymes are added for biological treatment, and finally the straw is refined, where the prepared mechanical pulp can meet the requirements of producing unbleached packaging paper and paper-based materials. At the same time, the by-products are recycled to prepare biomass compound fertilizer, which turns solid waste into treasure and realizes the high-value full utilization of wheat straw. Therefore, it has good practical application value and broad application prospects.

9 Claims, No Drawings

METHOD FOR PREPARING UNBLEACHED BIOMECHANICAL PULP FROM STRAWS AND FULL UTILIZATION OF BY-PRODUCTS

CROSS REFERENCE TO RELATED APPLICATION

This patent application claims the benefit and priority of Chinese Patent Application No. 202011639137.3 filed on Dec. 31, 2020, the disclosure of which is incorporated by reference herein in its entirety as part of the present application.

TECHNICAL FIELD

The present disclosure belongs to the technical field of papermaking technology and waste comprehensive utilization, and specifically relates to a method for preparing an unbleached biomechanical pulp from straws and full utilization of by-products.

BACKGROUND ART

Disclosure of the background art is only intended to increase the understanding of the overall background of the present disclosure, and is not necessarily regarded as an admission or suggestion in any form that the information has become the prior art known to those of ordinary skill in the art.

The papermaking industry is not only a consumer goods industry, but also an important basic raw material industry, involving many fields such as life, culture and education, industry and agriculture, national defense and aviation. In 2016, pulp imports reached 21.06 million tons, and waste paper imports reached 28.5 million tons in China. The degree of dependence on the import of papermaking fiber raw materials was close to 50%. The large waste paper imports made up the deficiency in fiber raw materials in China and supported the development of the papermaking industry. In April 2017, the Central Government of China issued "The latest progress of prohibiting import of the foreign waste, Progress on the implementation of the reform of the import management system for solid waste", which clearly stipulates that from the end of this year, China will ban the import of unsorted waste paper. In 2018, the total waste paper imports were 33% of 2017. By 2020, the import of waste paper will be prohibited in China. China is facing a shortage of about 26 million tons of papermaking raw materials every year. The shortage of resources in the traditional papermaking industry will be further highlighted. Development of new papermaking raw materials is imminent. To this end, the researchers make explorations on recyclable and renewable grass raw materials to find new papermaking raw materials.

In the traditional chemical pulping process, most of the hemicellulose in wheat straws is degraded and dissolved in the pulping black liquor. The black liquor is usually treated by an alkali recovery method to recover heat energy and alkali. Because the combustion calorific value of hemicellulose in black liquor is low, treatment by burning it directly will not only cause the waste of energy, but also the consumption of very good biomass resources. The development of a low-pollution, low-energy-consumption, and high-quality pulping method suitable for straw pulp is a focus of research in the papermaking industry in China, and also a bottleneck that needs to be broken in the development of the industry. Therefore, the applicant proposed a method for preparing an unbleached biomechanical pulp from straws. Straw as raw material for pulping was treated with steam or hot water, then a small amount of alkali was added, the straw was softened by hydrothermal saturation, then the temperature of the straw was adjusted, alkaline compound enzymes were added for biological treatment, and finally the straw was refined, where the prepared mechanical pulp can meet the requirements of producing unbleached packaging paper and paper-based materials (see CN109577059A). However, the problem of by-products produced in the pulping has not been well resolved, which is not conducive to the comprehensive high-value utilization of agricultural straw.

SUMMARY

In view of the above problems, the present disclosure provides a method for preparing an unbleached biomechanical pulp from straws and full utilization of by-products. In the present disclosure, straw as raw material for pulping is treated with steam, then a small amount of KOH is added, the straw is softened by hydrothermal saturation, then the temperature of the straw is adjusted, alkaline compound enzymes are added for biological treatment, and finally the straw is refined, where the prepared mechanical pulp can meet the requirements of producing unbleached packaging paper and paper-based materials. At the same time, the by-products are recycled to prepare biomass compound fertilizer, which turns solid waste into treasure and realizes the high-value full utilization of wheat straw. Therefore, it has good practical application value and broad application prospects.

The following technical schemes are adopted in the present disclosure:

According to a first aspect of the present disclosure, a method for preparing an unbleached biomechanical pulp from straws and full utilization of by-products is provided, which comprises the following steps:

(1) Cutting a physically selected dedusted air-dried straw into a ready-for-use raw material with a length of 3-6 cm; and collecting the straw that cannot be used as the ready-for-use raw material (such as rotten straw);

(2) Placing the ready-for-use raw material into a normal temperature processor or reactor, treating with alkaline compound enzymes according to a solid/liquid ratio of 1:4-1:8 W/V, during the treatment, adding a small amount of KOH to adjust the pH value of the straw to 7-14, and controlling the treatment time within 30-90 min; and collecting the wastewater generated during the enzyme-alkali co-treatment;

(3) Taking out the straw treated in step (2), and further treating with hot alkali (KOH) water steam at a temperature of 80-120° C.;

(4) Refining the straw treated in step (3) in one or more stages to make the beating degree at 25-55° SR;

(5) Washing with water after refining to obtain a biomechanical pulp; defibrating the biomechanical pulp by a defibrater and mixing evenly to obtain the unbleached biomechanical pulp; and collecting the washing water;

Evaporating and concentrating the wastewater produced in the enzyme-alkali co-treatment and washing water to obtain a residue, and recovering the heat energy for the hot alkali water steam treatment of step (3); mixing the residue with the straw that cannot be used as the ready-for-use raw material (such as rotten straw) in step (1), and adjusting the pH to make a fertilizer.

According to a second aspect of the present disclosure, a mechanical pulp and/or fertilizer prepared by the method described in above technical schemes are provided.

According to a third aspect of the present disclosure, an application of the above mechanical pulp in the preparation of unbleached packaging paper and paper-based materials and/or an application of the above fertilizer in promoting the growth of crops.

The present disclosure has the following beneficial effects:

In the present disclosure, straw is used as a raw material, treated with alkaline biological enzymes, heated with hot alkali steam, then refined, and washed. In the present disclosure, when the refining is completed, the pH value of the biomechanical pulp is close to neutral, and after washing the pulp, the washing water is treated with a multi-purpose evaporator, the solid residue is recovered for incineration in a boiler, and the heat energy is recovered for use in the treatment section with hot steam. The whole production process does not need alkali recovery, thereby avoiding environmental pollution from the source. This technology conforms to the national industrial policy of resource conservation, economic recycling, energy saving and emission reduction, and overcomes the problems of difficulty in recovering the alkali wastewater accompanying straw pulp and serious pollution in the prior art, which has great significance for the industrial production of straw pulp and the development of the papermaking industry.

The method of the present disclosure is simple and has low requirements on the equipment, and is suitable for the production of large and medium-sized pulp and paper production lines.

The ring crush index of the mechanical pulp prepared by the method of the present disclosure is significantly improved, and when used for preparing corrugated paper or boxboard paper, the compressive strength of the carton can be significantly improved. The by-products are used to prepare biomass compound fertilizer, which is rich in nutrients such as phosphorus and potassium. At the same time, the compound fertilizer also contains a large amount of hemicellulose which is easily biodegradable. It makes more use of crop absorption and soil improvement, thereby effectively promoting crop growth. At the same time, after optimizing the screening process conditions, the biomass compound fertilizer prepared in the present disclosure also has the advantages of high fertilizer efficiency and good storage stability. Therefore, it has good practical application value.

DETAILED DESCRIPTION OF THE EMBODIMENTS

It should be noted that the following detailed description is exemplary and is intended to provide a further description of the present disclosure. All technical and scientific terms used herein have the same meaning as commonly understood by one of ordinary skill in the art to which the present disclosure belongs, unless otherwise indicated.

It is to be noted that the terminology used herein is for the purpose of describing particular embodiments, and is not intended to limit the exemplary embodiments of the present disclosure. As used herein, the singular terms are also intended to include the plural, and it is also to be understood that when the terms "include" and/or "comprise" are used in the specification, they indicate the presence of features, steps, operations and/or combinations thereof, unless otherwise indicated.

In view of the problems raised in the background art, in a specific embodiment of the present disclosure, a method for preparing an unbleached biomechanical pulp from straws and full utilization of by-products is provided, which comprises the following steps:

(1) Cutting a physically selected dedusted air-dried straw into a ready-for-use raw material with a length of 3-6 cm; and collecting the straw that cannot be used as the ready-for-use raw material (such as rotten straw);

(2) Placing the ready-for-use raw material into a normal temperature processor or reactor, treating with alkaline compound enzymes according to a solid/liquid ratio of 1:4-1:8 W/V, during the treatment, adding a small amount of KOH to adjust the pH value of the straw to 7-14, and controlling the treatment time within 30-90 min; and collecting the wastewater generated during the enzyme-alkali co-treatment;

(3) Taking out the straw treated in step (2), and further treating with hot alkali (KOH) water steam at a temperature of 80-120° C.;

(4) Refining the straw treated in step (3) in one or more stages to make the beating degree at 25-55° SR;

(5) Washing with water after refining to obtain a biomechanical pulp; defibrating the biomechanical pulp by a defibrater and mixing evenly to obtain the unbleached biomechanical pulp; and collecting the washing water;

Evaporating and concentrating the wastewater produced in the enzyme-alkali co-treatment and washing water to obtain a residue, and recovering the heat energy for the hot alkali water steam treatment of step (3); mixing the residue with the straw that cannot be used as the ready-for-use raw material (such as rotten straw) in step (1), and adjusting the pH to make a fertilizer.

In a specific embodiment of the present disclosure, the alkaline biological compound enzyme used in step (2) is a compound enzyme of alkaline xylanase, alkaline cellulase, and alkaline pectinase, and the total dosage is 30-120 IU/mL; wherein the ratio of enzyme activity of the alkaline xylanase, alkaline cellulase and alkaline pectinase is 0-12: 0-5:0-3, the amount of each enzyme is not 0, more preferably 8-10: 3-4:2-3. By optimizing the ratio of enzyme activity of the biological compound enzyme, while ensuring the high performance of pulping, it can also be combined with the added amount of wastewater to effectively improve the fertilizer efficiency and storage stability of the fertilizer.

In a specific embodiment of the present disclosure, the amount of KOH added in step (2) is 0.5%-3%.

In a specific embodiment of the present disclosure, the treatment temperature in step (2) is 45-60° C. In this temperature range, the enzymatic hydrolysis efficiency is the highest.

In a specific embodiment of the present disclosure, the time of hot alkali water steam treatment is 10-60 min. Within this treatment time range, components such as lignin and hemicellulose can be dissolved out, and at the same time, it avoids the treatment time being too long, which causes the reduction of the pulp yield.

In a specific embodiment of the present disclosure, the pH value of the hot alkaline water in step (3) is 9-14. Using steam with this pH value for treatment has the best effect.

In a specific embodiment of the present disclosure, in step (5), the mass ratio of wastewater generated in the enzyme-alkali co-treatment to the washing water is 2-5: 5-10;

In a specific embodiment of the present disclosure, the mass ratio of the residue to the straw that cannot be used as a ready-for-use raw material in step (1) is 5-7: 1-2;

In a specific embodiment of the present disclosure, the process of adjusting the pH to make the fertilizer is as follows: adding phosphoric acid to adjust the pH value to 7, drying, pulverizing and granulating. Treating with phosphoric acid and introducing phosphorus and other nutrients while neutralizing alkalinity are more economical and environmentally friendly.

In a specific embodiment of the present disclosure, the straw is wheat straw.

In a specific embodiment of the present disclosure, a mechanical pulp and/or fertilizer prepared by the method described in above technical schemes are provided. The mechanical pulp obtained by the present disclosure not only has a high yield, but also has a significantly improved tensile strength and ring crush strength. At the same time, the prepared fertilizer is rich in nutrients such as phosphorus and potassium, which is beneficial to the growth of crops.

In a specific embodiment of the present disclosure, an application of the above mechanical pulp in the preparation of unbleached packaging paper and paper-based materials and/or an application of the above fertilizer in promoting the growth of crops.

To enable those skilled in the art to more clearly understand the technical schemes of the present disclosure, the technical schemes of the present disclosure will be described in detail below in conjunction with specific examples.

The biological enzymes used are from Shandong Longcote Enzyme Preparation Co., Ltd. and Novozymes (China) Biotechnology Co., Ltd.

Example 1 a Method for Preparing an Unbleached Biomechanical Pulp from Straws and Full Utilization of by-Products The method comprises the following steps:

(1) The physically selected dedusted air-dried straw was cut into a ready-for-use raw material with a length of 3 cm; and the straw that cannot be used as the ready-for-use raw material (such as rotten straw) was collected;

(2) The ready-for-use raw material was placed into a normal temperature processor or reactor, treated with warm water and alkaline compound enzymes according to a solid/liquid ratio of 1:5 kg/L, during the treatment, KOH was added to adjust the pH value of the straw to 8, the treatment time was controlled within 90 min, the temperature was 50° C., the dosage of enzyme was 100 IU/mL and the ratio of enzyme activity of the alkaline xylanase, alkaline cellulase and alkaline pectinase was 8:3:2; and the wastewater generated during the enzyme-alkali co-treatment was collected;

(3) The straw treated in step (2) was taken out, and the softened wheat straw was further treated with hot alkali (KOH) water steam at a pH of 14 and a temperature of 110° C. for 60 min to dissolve out some hemicellulose, lignin, pectin and other substances;

(4) The straw treated in step (3) was refined in one or more stages to make the beating degree at 41° SR;

(5) The pulp was washed with water after refining to obtain a biomechanical pulp; the biomechanical pulp was defibrated by a defibrater and mixed evenly to obtain the unbleached biomechanical pulp; and the washing water was collected;

The wastewater produced in the enzyme-alkali co-treatment and washing water were mixed according to a mass ratio of 2:5, evaporated and concentrated by a multi-purpose evaporator to obtain a residue, and the heat energy for the hot alkali steam treatment of step (3) was recovered; the residue was mixed with the straw that cannot be used as the ready-for-use raw material (such as rotten straw) in step (1) according to a mass ratio of 6:1, phosphoric acid was added to adjust the pH to 7, the resulting mixture was dried, pulverized and granulated to obtain a biomass compound fertilizer.

Example 2 a Method for Preparing an Unbleached Biomechanical Pulp from Straws (1) The physically selected dedusted air-dried straw was cut into a ready-for-use raw material with a length of 4 cm; and the straw that cannot be used as the ready-for-use raw material (such as rotten straw) was collected;

(2) The ready-for-use raw material was placed into a normal temperature processor or reactor, treated with warm water and alkaline compound enzymes according to a solid/liquid ratio of 1:4 kg/L, during the treatment, KOH was added to adjust the pH value of the straw to 9, the treatment time was controlled within 60 min, the temperature was 55° C., the dosage of enzyme was 30 IU/mL and the ratio of enzyme activity of the alkaline xylanase, alkaline cellulase and alkaline pectinase was 10:4:3; and the wastewater generated during the enzyme-alkali co-treatment was collected;

(3) The straw treated in step (2) was taken out, and the softened wheat straw was further treated with hot alkali (KOH) water steam at a pH of 13 and a temperature of 120° C. for 10 min to dissolve out some hemicellulose, lignin, pectin and other substances;

(4) The straw treated in step (3) was refined in one or more stages to make the beating degree at 40° SR;

(5) The pulp was washed with water after refining to obtain a biomechanical pulp; the biomechanical pulp was defibrated by a defibrater and mixed evenly to obtain the unbleached biomechanical pulp; and the washing water was collected;

The wastewater produced in the enzyme-alkali co-treatment and washing water were mixed according to a mass ratio of 2:3, evaporated and concentrated by a multi-purpose evaporator to obtain a residue, and the heat energy for the hot alkali steam treatment of step (3) was recovered; the residue was mixed with the straw that cannot be used as the ready-for-use raw material (such as rotten straw) in step (1) according to a mass ratio of 3:1, phosphoric acid was added to adjust the pH to 7, the resulting mixture was dried, pulverized and granulated to obtain a biomass compound fertilizer.

Example 3 a Method for Preparing an Unbleached Biomechanical Pulp from Straws (1) The physically selected dedusted air-dried straw was cut into a ready-for-use raw material with a length of 5 cm; and the straw that cannot be used as the ready-for-use raw material (such as rotten straw) was collected;

(2) The ready-for-use raw material was placed into a normal temperature processor or reactor, treated with warm water and alkaline compound enzymes according to a solid/liquid ratio of 1:6 kg/L, during the treatment, KOH was added to adjust the pH value of the straw to 8, the treatment time was controlled within 60 min, the temperature was 50° C., the dosage of enzyme was 80 IU/mL and the ratio of enzyme activity of the alkaline xylanase, alkaline cellulase and alkaline pectinase was 10:4:3; and the wastewater generated during the enzyme-alkali co-treatment was collected;

(3) The straw treated in step (2) was taken out, and the softened wheat straw was further treated with hot alkali (KOH) water steam at a pH of 12 and a temperature of 100° C. for 30 min to dissolve out some hemicellulose, lignin, pectin and other substances;

(4) The straw treated in step (3) was refined in one or more stages to make the beating degree at 38° SR;

(5) The pulp was washed with water after refining to obtain a biomechanical pulp; the biomechanical pulp was defibrated by a defibrater and mixed evenly to obtain the unbleached biomechanical pulp; and the washing water was collected;

The wastewater produced in the enzyme-alkali co-treatment and washing water were mixed according to a mass ratio of 2:5, evaporated and concentrated by a multi-purpose evaporator to obtain a residue, and the heat energy for the hot alkali water steam treatment of step (3) was recovered; the residue was mixed with the straw that cannot be used as the ready-for-use raw material (such as rotten straw) in step (1) according to a mass ratio of 2:7, phosphoric acid was added to adjust the pH to 7, the resulting mixture was dried, pulverized and granulated to obtain a biomass composite fertilizer.

Experimental Example 1: The method is the same as that in Example 1, and the difference is that the dosage ratio of alkaline compound enzymes is adjusted, specifically, the ratio of enzyme activity of alkaline xylanase, alkaline cellulase, and alkaline pectinase is controlled to 12:5:2, and the total dosage is 100 IU/mL.

Experimental Example 2: The method is the same as that in Example 1, and the difference is that the dosage ratio of alkaline compound enzymes is adjusted, specifically, the ratio of enzyme activity of alkaline xylanase, alkaline cellulase, and alkaline pectinase is controlled to 11:4:1.5, and the total dosage is 100 IU/mL.

Experimental Example 3: The method is the same as that in Example 1, and the difference is that the mass ratio of the wastewater generated in the enzyme-alkali co-treatment to the washing water is controlled to 2:1.

Experimental Example 4: The method is the same as that in Example 1, and the difference is that the mass ratio of the wastewater generated in the enzyme-alkali co-treatment to the washing water is controlled to 1:6.

Experimental Example 5: The method is the same as that in Example 1, and the difference is that the mass ratio of the residue to the straw that cannot be used as a ready-for-use raw material in step (1) is controlled to 2:1.

Experimental Example 6: The method is the same as that in Example 1, and the difference is that the mass ratio of the residue to the straw that cannot be used as a ready-for-use raw material in step (1) is controlled to 1:3.

Effectiveness Verification:

1. Table 1 shows the comparison of the pulping physical properties of biomechanical pulp prepared in Example 1, Experimental Examples 1 and 2. It can be seen that the physical properties of each pulp are better, meeting the requirements for the production of unbleached packaging paper and paper-based materials. The physical properties of pulp in Experimental Example 3-6 are the same as that of example 1.

TABLE 1

Properties of the biomechanical pulp prepared by different methods

| method | beating degree/ °SR | tensile property/ km | tearing resistance/ $mN \cdot m^2 \cdot g^{-1}$ | pulp yield % | ring crush index |
|---|---|---|---|---|---|
| Example 1 | 41 | 3.28 | 3.57 | 84.6 | 11.21 |
| Experimental Example 1 | 42 | 3.15 | 3.61 | 83.9 | 11.18 |
| Experimental Example 2 | 41 | 3.2 | 3.16 | 85.2 | 11.36 |

2. Fertilizer efficiency test of biomass compound fertilizers prepared in Example 1, and Experimental Examples 1-6

(1) Corn Potting Test

The biomass compound fertilizers prepared in Example 1, Experimental Examples 1-6 were applied to potted corn for experiment, and the biomass compound fertilizer (3 g/kg soil) was applied in the corn seedling stage. The results are shown in Table 2, indicating that compared with the control group CK without fertilization, Example 1 and Experimental Examples 1-6 both increase the corn biomass, and Example 1 has the best effect.

TABLE 2

| example | biomass (g/pot) | increase (%) |
|---|---|---|
| CK | 5.24 | — |
| Example 1 | 6.43 | 22.7 |
| Experimental Example 1 | 5.95 | 13.5 |
| Experimental Example 2 | 5.81 | 10.9 |
| Experimental Example 3 | 6.14 | 17.2 |
| Experimental Example 4 | 6.27 | 19.7 |
| Experimental Example 5 | 5.99 | 14.3 |
| Experimental Example 6 | 5.87 | 12.0 |

(2) Wheat Potting Test

The biomass compound fertilizer prepared in Example 1, Experimental Examples 1-6 were applied to potted wheat for experiment, and the biomass compound fertilizer (5 g/kg soil) was applied at the wheat seedling stage. The results are shown in Table 3, indicating that compared with the control group CK without fertilization, Example 1 and Experimental Examples 1-6 both increase the wheat biomass, and Example 1 has the best effect.

TABLE 3

| example | biomass (g/pot) | increase (%) |
|---|---|---|
| CK | 8.69 | — |
| Example 1 | 10.52 | 21.1 |
| Experimental Example 1 | 9.47 | 9.0 |
| Experimental Example 2 | 9.32 | 7.2 |
| Experimental Example 3 | 9.86 | 13.5 |
| Experimental Example 4 | 9.79 | 12.7 |
| Experimental Example 5 | 9.59 | 10.4 |
| Experimental Example 6 | 9.21 | 6.0 |

Storage Stability Test of the Biomass Compound Fertilizers Prepared in Example 1, and Experimental Examples 1-6

For a long time, the problem of blocking has affected the appearance quality of the compound fertilizer and brought inconvenience to the transportation and application of the compound fertilizer. Therefore, the storage stability (anti-blocking performance) of the prepared biomass compound fertilizer was tested by a briquetting method under the condition that the temperature was 50° C., the pressure was 147 N, and the time was 15 d. A 50 g of compound fertilizer sample was placed in the ring, and the shear force data was measured on the cylindrical compound fertilizer briquettes. The test results are shown in Table 4. It can be seen that the biomass compound fertilizer prepared in Example 1 of the present application has the highest storage stability, which is better than that of the biomass compound fertilizer prepared in Experimental Examples 1-6.

TABLE 4

| example | Shear force (N) | anti-blocking rate (%) |
|---|---|---|
| Example 1 | 27.51 | 63.1 |
| Experimental Example 1 | 38.57 | 48.3 |
| Experimental Example 2 | 41.72 | 44.1 |
| Experimental Example 3 | 49.34 | 33.9 |
| Experimental Example 4 | 45.29 | 39.3 |
| Experimental Example 5 | 35.25 | 52.8 |
| Experimental Example 6 | 42.83 | 42.6 |

Note:
Anti-blocking rate = (blank shear force − shear force of sample)/blank shear force × 100%, blank shear force is 74.62 N.

The above examples are preferred embodiments of the present disclosure, but the embodiments of the present disclosure are not limited to thereto. Any other changes, modifications, replacements, combinations, and simplifications may be made without departing from the spirit and scope of the present disclosure, which are all embraced in the scope of the present disclosure.

What is claimed is:

1. A method for preparing an unbleached biomechanical pulp from straws and full utilization of by-products, wherein comprising the following steps:
   (1) cutting a physically selected dedusted air-dried straw into a ready-for-use raw material with a length of 3-6 cm; and collecting a straw that cannot be used as the ready-for-use raw material;
   (2) placing the ready-for-use raw material into a reactor, treating with an alkaline compound enzyme according to a solid/liquid ratio of 1:4-1:8 W/V, during the treatment, adding KOH to adjust the pH value of the straw to 7-14, and controlling the treatment time within 30-90 min to obtain a treated straw; and collecting the wastewater generated during the enzyme-alkali co-treatment;
   (3) taking out the treated straw in step (2), and further treating with hot alkali (KOH) water and steam at a temperature of 80-120° C. to obtain a hot alkali treated straw;
   (4) refining the hot alkali treated straw in step (3) in one or more stages to make the beating degree at 25-55° SR to obtain a refined pulp;
   (5) washing with water the refined pulp to obtain a biomechanical pulp; defibrating the biomechanical pulp by a defibrater and mixing evenly to obtain the unbleached biomechanical pulp; and collecting the washing water;
   evaporating and concentrating the wastewater generated in the enzyme-alkali co-treatment and the washing water to obtain a residue, and recovering the heat energy for the hot alkali (KOH) water and steam treatment of step (3); mixing the residue with the straw that cannot be used as the ready-for-use raw material in step (1), and adjusting the pH to make a fertilizer.

2. The method according to claim 1, wherein the alkaline biological compound enzyme used in step (2) is a compound enzyme of alkaline xylanase, alkaline cellulase, and alkaline pectinase, and the total dosage is 30-120 IU/mL; wherein the ratio of enzyme activity of the alkaline xylanase, alkaline cellulase and alkaline pectinase is 0-12:0-5: 0-3, wherein the activity of each enzyme is not 0.

3. The method according to claim 2, wherein the ratio of enzyme activity of the alkaline xylanase, alkaline cellulase and alkaline pectinase is 8-10:3-4:2-3.

4. The method according to claim 1, wherein an amount of KOH added in step (2) is 0.5%- 3% of the mass of the dedusted air-dried straw.

5. The method according to claim 1, wherein the treatment temperature in step (2) is 45-60° C.

6. The method according to claim 1, wherein the time of the hot alkali (KOH) water and steam treatment is 10-60 min.

7. The method according to claim 1, wherein the pH value of the hot alkaline (KOH) water and steam in step (3) is 9-14.

8. The method according to claim 1, wherein in step (5), the mass ratio of wastewater generated in the enzyme-alkali co-treatment to the washing water is 2-5: 5-10;
   the mass ratio of the residue to the straw that cannot be used as a ready-for-use raw material in step (1) is 5-7:1-2; and
   the process of adjusting the pH to make the fertilizer is as follows: adding phosphoric acid to adjust the pH value to 7, drying, pulverizing and granulating.

9. The method according to claim 1, wherein the straw is wheat straw.

* * * * *